United States Patent Office 2,950,503
Patented Aug. 30, 1960

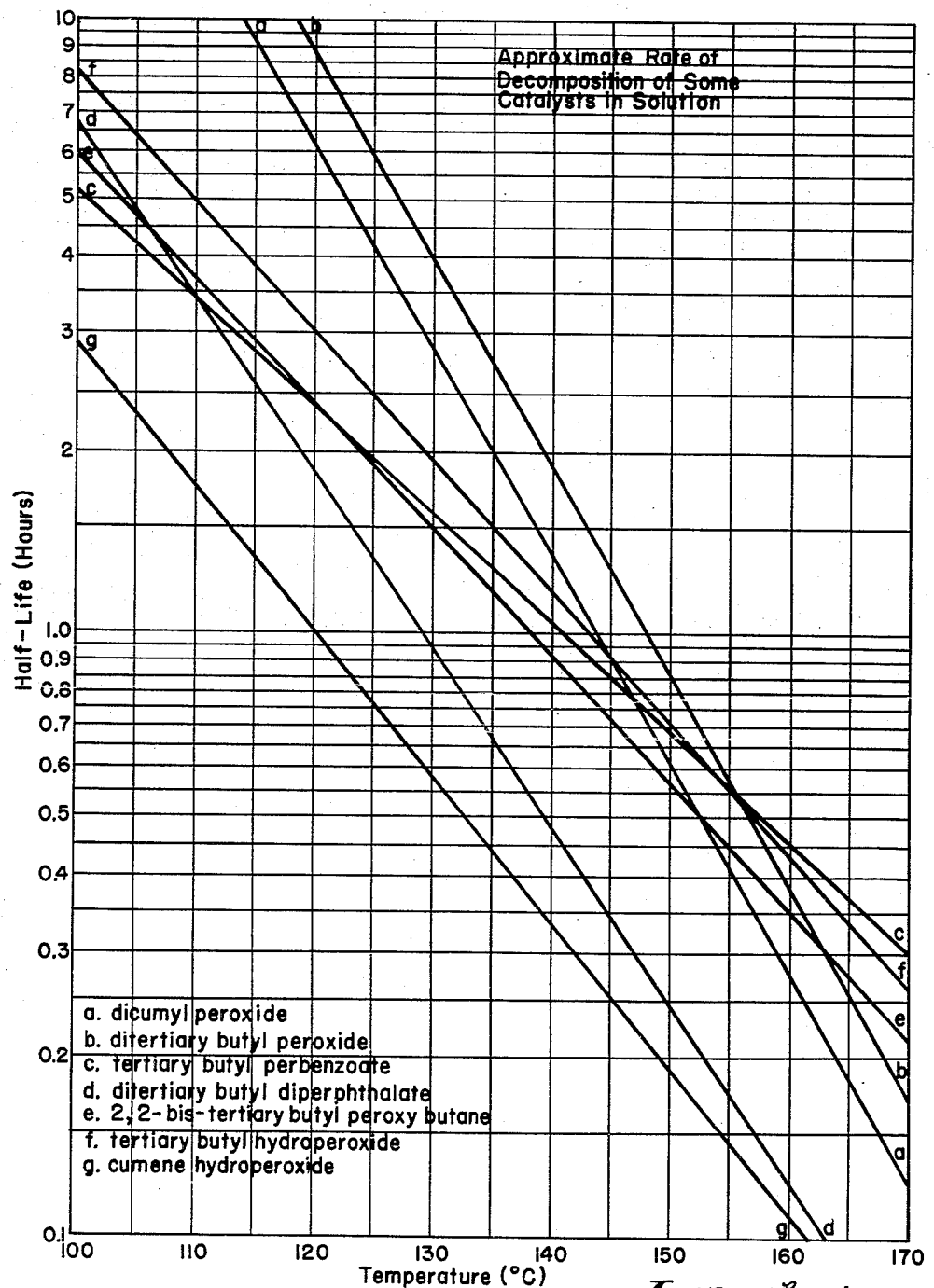

2,950,503

VULCANIZATION OF NUCLEAR ALKYL SUBSTITUTED STYRENES WITH ORGANIC PEROXIDES

Wayne A. McRae, Lexington, Mass., assignor to Ionics, Incorporated, Cambridge, Mass., a corporation of Massachusetts Filed Dec. 5, 1956, Ser. No. 626,491

6 Claims. (Cl. 18—57)

This invention relates to vulcanized polymerizates and to the methods of procedure for preparing the same. More particularly, certain homopolymers or copolymers of nuclearly substituted alkyl derivatives of styrene are crosslinked in the presence of high temperature free radical catalysts, such as organic peroxides, to produce solid, insoluble, infusible products of the character of molded articles, vulcanized homopolymeric and copolymeric sheets, ion exchange resins in granular and sheet (membrane) forms.

The use of high temperature free radical catalysts, particularly organic peroxides such as dicumyl peroxide, dibenzal diperoxide, ditertiary butyl peroxide, tertiary butyl peracetate, parachlorobenzoyl peroxide and tertiary butyl perphthalic acid is known for the vulcanization of natural and synthetic rubbers having olefinic unsaturation, such as butadiene-styrene, butadiene-acrylonitrile, and chloroprene; for the curing of polyester resins; for bulk suspension or solution polymerization of monomers; and for the styrenation of unsaturated oils and alkyds, as for example for the copolymerization of styrene and linseed oil.

It has been found that homopolymeric polystyrene is not vulcanized under the usual conditions by such high temperature catalysts. Furthermore, copolymers of styrene with mono-olefinic hydrocarbons such as iso-butylene are not cross-linked by this curing system.

It has now been found that homopolymers of certain nuclearly substituted alkyl derivatives of styrene such as vinyl toluene and ethyl vinyl benzene and their linear copolymers such as isobutylene-vinyl toluene may be vulcanized with such high temperature catalysts and thereby rendered infusible and insoluble in ordinary solvents for uncross-linked linear polystyrene. Some of the copolymers which may be cross-linked in this manner include, for example, copolymers of vinyl toluene or ethyl vinyl benzene with isobutylene, alphamethyl styrene, vinyl carbazole, acrylonitrile, fumaronitrile, maleonitrile, styrene, parachlorostyrene, methylmethacrylate, vinyl pyridine, and methoxy styrene. It should be particularly noted that this vulcanization is carried out in the absence of normal cross-linking monomers such as divinyl benzene or ethylene glycol dimethacrylate.

Such cross-linked polymers and copolymers are useful for the preparation of molded articles of varied shapes and sizes such as are prepared in conventional injection or compression molding machines and are particularly useful because of their high softening point, resistance to boiling water, improved strength and excellent heat resistance in the cured state. In many cases the vulcanized polymers may be hot-formed into sundry useful articles since they attain a soft elastic state (not plastic) at elevated temperatures (e.g. 200° C.).

In one of the preferred methods of carrying out this invention the homopolymers or copolymers of certain nuclearly substituted alkyl derivatives of styrene are polymerized in an emulsion or suspension system in known ways to form an emulsion or suspension of polymeric products. An emulsion or suspension of the high temperature catalyst (preferably from 0.1 to 10% by weight of catalyst based upon the polymer) is added to the emulsion or suspension of the polymer and the mixture is then co-precipitated in well known manner to give a product containing the high temperature catalyst in intimate mixture. This mixture may then be used in conventional compression or injection molding equipment. Preferably the molding temperature is such that the reaction between the polymer and the catalyst is substantially complete in a range of from one minute to three hours but it should be understood that with certain types of molded articles, for example large articles, it is desirable to use substantially longer curing times and lower curing temperatures. A suitable curing temperature is one at which the high temperature catalyst has a half-life for decomposition of from one minute to one hour. It will be understood that particularly in injection molding equipment and sometimes for compression molding it may be desirable to remove the article from the mold before the cure is completed and to finish the cure outside the mold, for example in an oven or hot water bath. Curing temperatures range from 100 to 200° C. but the preferred range for efficient crosslinking is from 130 to 180° C. The preferred catalysts are those which have at curing temperature a half-life for decomposition into free radicals (measured in dilute solution in an inert solvent such as diphenyl) in the range of about 0.2 to about 2.0 hours. The drawing is self explanatory and shows the approximate variation of half-life with temperatures of a number of common free radical catalysts. Ditertiary butyl diperphthalate is usually not as effective as the other catalysts shown but may be used satisfactorily with some polymers. Cumene hydroperoxide is not generally satisfactory and is included for a reference point. It belongs rather to the class of moderate temperature catalysts. Dicumyl peroxide and ditertiary butyl peroxide are particularly effective. In general catalysts which have a half life for decomposition into free radicals of at least about four hours at 100° C. will be at least partially effective if the vulcanization is carried out in the range of about 130 to 180° C. For some catalysts with some polymers of alkyl derivatives of styrene the vulcanization is more efficient in the absence of air and under neutral or alkaline conditions. At present there is no universal criteria for predicting the sensitivity of a catalyst polymeric system to air.

In another preferred method for carrying out this invention the polymer or copolymer of nuclear substituted primary or secondary alkyl derivatives of styrene is broken down on a rubber mill until plastic, the temperature of the rubber mill is adjusted to be substantially less than the curing temperature, and then the high temperature free radical catalyst is added (preferably from 0.1 to 10% by weight) and thoroughly mixed with the polymer. The polymer containing the catalyst is removed from the mill and placed in a compression mold where it is cured as described above. It may of course be calendered in well known apparatus and then cured. In place of a rubber mill other types of mills suitable for the compounding of plastics may be used, such as a Banbury mill, provided only that the temperature of mixing or kneading is substantially less than the curing temperature for the high temperature catalyst used. Obviously the polymer may be loaded with other materials such as plastics, plasticizers, extenders, fillers, pigments, reinforcements, accelerators, activators, odorants and so forth. It is usually desirable for efficient curing that the compounded polymer have a neutral or basic reaction.

According to this invention suitable nuclearly substituted alkyl derivatives of styrene include those derivatives which have the following structure:

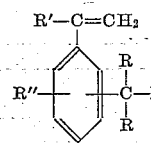

Where R' is hydrogen, methyl or ethyl and where R is hydrogen or an alkyl group such as methyl, ethyl, propyl, isopropyl, etc. Such compounds will be referred to herein as the nuclearly substituted alkyl derivatives of styrene having at least one alpha hydrogen in the alkyl substituent. They are clearly nuclearly substituted primary or secondary alkyl derivatives of styrene. It will be understood that other substituents may also be present in the aromatic ring as represented by R''. Such substituents include methyl, ethyl, chloro, cyano, and so forth. Preferred derivatives are those in which at least one of the R's is hydrogen, R' is hydrogen and R'' is —CH$_3$. In addition to vinyl toluene and ethyl vinyl benzene, preferred derivatives include vinyl xylene, vinyl cumene and vinyl pseudocumene.

The following examples have been selected for purposes of further illustrations and are not presented to suggest limitations not previously described and not included in the appended claims.

*Example 1.—Preparation of vulcanized sheets of linear polymeric vinyl toluene*

In a preferred example of carrying out this invention 100 parts of linear polymeric vinyl toluene were broken down on a rubber mill at about 220° F. until plastic. Three parts of dicumyl peroxide were added and were thoroughly blended. The hot compound was removed from the mill and placed in a compression mold having an aperture of 6" x 6" x 1/16" and cured under a pressure of 1000 pounds per square inch at a temperature of 310° F. for 15 minutes. The resulting sheet was readily removed from the mold and was found to be hard, tough and free from color. A portion of the sheet was placed in boiling diethyl benzene (182° C.) and on prolonged boiling was found to be insoluble although it became rubbery and elastic. When the diethyl benzene was allowed to evaporate the sheet returned to its original hard condition. A second portion was placed on an electric hot plate at a temperature of about 400° C. It became rubbery and elastic and began to decompose thermally although it did not melt. A third portion was heated over a flame until it was plastic and then was drawn out and cooled. In the cooled state it retained its drawn configuration. Upon reheating above the softening point the drawn portion assumed its previous shape. A fourth portion of the sheet was sawed on a high speed bandsaw. It gave a clean cut without fouling the saw and had a hard nonagglomerated sawdust. It will be noted by those skilled in the art that the above behavior is profoundly different from normal linear polystyrene or linear polymeric vinyl toluene and is similar to the expensive and difficultly prepared copolymers of styrene and divinyl benzene.

In a similar experiment with polystyrene, 3 parts per hundred of dicumyl peroxide were added and the curing was carried out under the same conditions noted above. In this case no effect of the dicumyl peroxide was found and the properties of the resulting sheet were identical to those of polystyrene molded in the absence of a high temperature catalyst.

The principles of cross-linking nuclear alkyl methylene derivatives of styrene are not clear. It should be pointed out, however, that in similar nuclear alkyl derivatives of benzene the methylene carbon is particularly sensitive to substitution reactions indicating that the hydrogen atoms present are particularly labile. It is believed that this fact is related to the reactivity of the nuclear alkyl derivatives of styrene of this invention with high temperature catalysts. It is also believed that the Kharasch coupling reaction (Kharasch, McBay and Urry, Journal of Organic Chemistry, vol. 10, p. 401; see also Wiles, Biship, Devlin, Hopper, Schroeder and Vaughan, Industrial and Engineering Chemistry, vol. 41, p. 1682), with peroxides may be related. The reaction may be represented with cumene as follows:

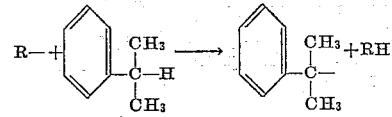

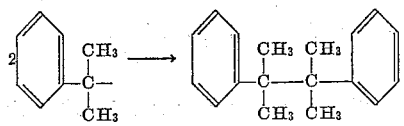

where R represents a free radical. It should be noted, however, that polystyrene contains a similar grouping, namely:

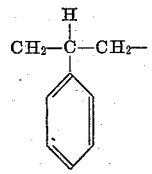

but has not been found to vulcanize with high temperature free radical catalysts. It must be concluded that the above explanation is not sufficient to explain all the facts.

*Example 2.—Ion exchange resins from copolymers of vinyl toluene*

In another preferred example for carrying out this invention a mixture of 75 parts of vinyl toluene and 25 parts of styrene with 2 parts per hundred of ditertiary butyl peroxide and one part per hundred of lauroyl peroxide was polymerized in suspension of 300 parts of water with stirring using a small amount of starch as a stabilizing agent. Both the vinyl toluene and styrene were inhibitor free. The polymerization was carried out at 70° C. for 24 hours. The resulting beads were carefully washed free of stabilizer. A portion of the beads were used in the compression mold of Example 1 at a pressure of 1000 pounds per square inch and a temperature of 320° F. for 30 minutes to give a clear insoluble infusible polymer in sheet form similar in all respects to those prepared above. A second portion of the beads were suspended in 4 volumes of water with stirring and a small amount of starch in an autoclave which was held at a temperature of 320° F. and a pressure of 90 pounds per square inch for 30 minutes. The resulting beads were insoluble and infusible. A portion of these beads was swelled with ethylene dichloride and stirred with four volumes of chloromethyl ether containing 10% by weight of anhydrous ferric chloride. After 17 hours the beads were rinsed with methanol and then placed in four volumes of 20% trimethylamine where they were stirred for 6 hours. The resulting chloromethylated aminated beads had an ion exchange capacity of about 2.7 milliequivalents per dry gram and were found to be highly effective when in the hydroxide form in removing anions from contacting aqueous solutions thereof.

In place of the above autoclaving, beads have been vulcanized in similar manner at atmospheric pressure in ethylene glycol.

A second portion of the insoluble and infusible beads were soaked in ethylene dichloride and then stirred for 17 hours at room temperature with 4 volumes of 100% sulfuric acid. The resulting beads were drained and then stirred for one hour with 3 volumes of 50% sulfuric acid and after again draining were stirred for 30 minutes with 3 volumes of saturated sodium chloride solution. They were then contacted for 30 minutes with 3 volumes of 10% sodium chloride solution and were finally rinsed with water. They were found to have an ion exchange capacity of about 3.0 milliequivalents per dry gram and when in the hydrogen form were highly effective in removing cations from contacting aqueous solutions thereof.

*Example 3.—Ion exchange membranes*

In another example of carrying out this invention a mixture of 65 parts vinyl toluene, 35 parts of diphenyl, 0.5 part benzoyl peroxide and 2.5 parts of dicumyl peroxide were cast on a woven glass staple cloth between glass plates and were heated in an oven at 80° C. for 15 hours. At the end of this time the temperature was raised at 160° C. for one hour, after which the casts were cooled slowly to room temperature. The resulting sheets were found to be infusible and insoluble. The edges of the cast had dried during polymerization and curing and prevented further evaporation of interior portions of the cast.

A portion of the above sheets were rinsed in ethylene dichloride and were reacted with a solution of 10 parts by weight of anhydrous ferric chloride in 100 parts of chloromethyl ether for 17 hours at room temperature. The resulting chloromethylated sheets were rinsed repeatedly in methanol and reacted in a 20% aqueous solution of dimethylethanolamine for 24 hours at room temperature. The resulting membranes were then treated with 10% hydrochloric acid for 4 hours and then with 10% aqueous sodium chloride for one hour and were finally rinsed thoroughly with water. They were found to have an electrical resistance of about 20 ohms per square centimeter and an anion exchange capacity of about 2.5 milliequivalents per dry gram of resin. When used in a 2-compartment membrane cell containing 0.6 N sodium chloride in both compartments, a direct current density of about 10 milliamperes per square centimeter of membrane, about 90% of the current passing through the membrane was found to be carried by chloride ions.

A second portion of the infusible insoluble sheets prepared above was rinsed with ethylene dichloride and placed in 98% sulfuric acid at room temperature for 17 hours. The resulting sulfonated sheet was drained and placed in a 50% sulfuric acid for 3 hours then in 20% aqueous sodium chloride for one hour, next in 10% sodium chloride for 30 minutes. It was then placed in 5% sodium chloride for 30 minutes and finally thoroughly rinsed with water. The resulting ion exchange membrane had a cation exchange capacity of about 3.0 milliequivalents per dry gram of resin and an electrical resistance of about 15 ohms per square centimeter of membrane. It was tested in a 2-compartment cell for selective conductivity as described above and was found to have a current efficiency of about 90% for the conductance of sodium ions in 0.6 N aqueous sodium chloride at room temperature.

In many cases it may be desirable to add a few percent or a few tenths of one percent of a bifunctional monomer such as divinyl benzene to the monomeric nuclear alkyl derivatives to increase the molecular weight of the linear polymer or, for example, in the case of the ion exchange membranes of this example, to give an insoluble gel to assist in handling. The primary crosslinking may then be provided by the high temperature free radical catalyst.

*Example 4.—Vulcanized copolymer of ethyl styrene*

In another example of carrying out this invention paraethyl styrene was prepared according to the method of Mowry, Renoll and Huber, Journal of the American Chemical Society, vol 68, p. 1105. A mixture of 70 parts paraethyl styrene, 30 parts of 2-vinyl pyridine with 3 parts per hundred of dicumyl peroxide and one part per hundred of 2,4-dichlorobenzoyl peroxide was polymerized in suspension in 300 parts of water with stirring using one part per hundred of hydroxy apatite as a suspending agent. The polymerization was carried out at 50° C. for 24 hours. The resulting beads were carefully washed free of suspending agent. A portion of the beads were cured in the compression mold of Example 1 at a pressure of 100 pounds per square inch at a temperature of 315° F. for 20 minutes to give an insoluble infusible polymer in sheet form. The sheet had a yellowish color.

*Example 5.—Vulcanized homopolymer of vinyl xylene*

In another example of carrying out this invention 3,5-dimethyl styrene, (vinyl xylene) was prepared according to the method of Marvel, Saunders and Overberger, Journal of the American Chemical Society, vol. 68, p. 1085. One hundred parts of the monomer were mixed with one part of cumene hydroperoxide and 3 parts of dicumyl peroxide and were cast on a woven glass cloth between glass plates and were heated in an oven at 80° C. for 10 hours. The temperature was then raised to 155° C. where it was maintained for one hour after which the casts were cooled slowly to room temperature. The resulting sheets were found to be infusible and insoluble.

*Example 6.—Vulcanized homopolymer of vinyl orthochlorotoluene*

In another example for carrying out this invention vinyl orthochlorotoluene was prepared from orthochlorotoluene through acetochlorotoluene by the method of Brooks, Journal of the American Chemical Society, vol. 66, p. 1295. This monomer was polymerized in bulk with 0.5 part per hundred of benzoyl peroxide at a temperature of 70° C. for 17 hours, followed by 3 hours at 120° C. The resulting polymer was broken down on a laboratory rubber mill and mixed with 2 parts per hundred of dicumyl peroxide. The resulting mixture was cured in a compression mold at a pressure of 1000 pounds per square inch and at a temperature of 315° F. The resulting material was insoluble and infusible.

*Example 7.—Vulcanized copolymer of isopropenyl toluene and isobutylene*

In another example of carrying out this invention para, alpha-dimethyl styrene (para isopropenyl toluene) was prepared from para-cymene over a chrome-alumina catalyst at 1100° F. in the presence of two hundred mol percent of benzene according to the method of Kobe and Romans, Industrial and Engineering Chemistry, vol. 43, p. 1755. The impure product was fractionated in a distillation column taking that fraction which boiled in a range of 183 to 189° C. Forty parts of iso-propenyl toluene were mixed with 60 parts by weight of isobutylene at −80° C. and the mixture dried over metallic sodium. The mixture was added to 200 parts of dry carbon disulfide and the temperature was maintained at about −80° C. in a Dewar flask. An excess of crushed Dry Ice was maintained in the flask while two parts of anhydrous aluminum chloride in 200 parts of carbon disulfide were added slowly with vigorous stirring. The mixture after standing for one hour was poured into 1000 parts of iso-propanol containing 5 parts of sodium hydroxide. The mixture was evaporated to ½ its original volume on a steam bath and the solid material was separated and washed thoroughly with iso-propanol. After drying the polymer was broken down on a laboratory rubber mill and 3 parts per hundred by weight of dicumyl peroxide and 2 parts of morpholine were added. When the peroxide was thoroughly blended the mixture was cured in a compression mold at 315° F. and a pressure of 1000 pounds per square inch for 20 minutes. The resulting sheets were found to be insoluble and infusible. Similar vulcanized polymers from isobutylene and vinyl toluene have been found to be greatly superior to styrene-butadiene resins with regard to ruggedness and resistance to oxidizing conditions.

In general it has been found that best results in vulcanization of copolymers is obtained if the alkyl derivative of styrene, having at least one alpha hydrogen on the alkyl substituent, is present to the extent of not less than about 20 weight percent in the copolymer.

Having thus disclosed my invention and described in detail preferred embodiments thereof, I claim and desire to secure by Letters Patent.

1. The method of forming a solid insoluble infusible compound of a polymer of vinyl toluene, comprising milling from 0.1 to 10% by weight of a high temperature free radical catalyst selected from the group consisting of dicumyl peroxide, ditertiary butyl peroxide, tertiary butyl perbenzoate, ditertiary butyl diperphthalate, 2,2-bis-tertiary butyl peroxybutane and tertiary butyl hydroperoxide into said polymer forming a uniform intimate mixture therewith, and curing the same at a temperature between about 130° C. and 180° C.

2. The method of claim 1 wherein the polymer comprises a homopolymer of vinyl toluene and the free radical catalyst is dicumyl peroxide.

3. The method of claim 1 wherein the polymer comprises a co-polymer of a substantial amount of vinyl toluene and a monovinyl compound capable of polymerizing therewith.

4. In the method of forming a solid membrane comprising an insoluble infusible synthetic organic polymeric structure, the steps of forming a dispersion in an organic solvent of a polymer of vinyl toluene, intimately mixing therewith from 0.1 to 10% by weight of a catalyst selected from the group consisting of dicumyl peroxide, ditertiary butyl peroxide, tertiary butyl perbenzoate, ditertiary butyl diperphthalate, 2,2-bis-tertiary butyl peroxybutane and tertiary butyl hydroperoxide, shaping said dispersion into film form and curing said film to the insoluble infusible state at a temperature between 130° to 180° C. in the presence of said organic solvent under conditions substantially preventive of the escape of said solvent thereby forming said polymeric structure, thereafter substantially maintaining the solvent content of said structure.

5. The product produced by the method of claim 1.

6. The product produced by the method of claim 4.

References Cited in the file of this patent

UNITED STATES PATENTS

| | | |
|---|---|---|
| 2,689,833 | Hwa | Sept. 21, 1954 |
| 2,730,768 | Clarke | Jan. 17, 1956 |
| 2,734,894 | Vaughan | Feb. 14, 1956 |
| 2,788,331 | Greer | Apr. 9, 1957 |
| 2,816,089 | Willis | Dec. 10, 1957 |
| 2,867,603 | Safford et al. | Jan. 6, 1959 |